(12) United States Patent
Duan et al.

(10) Patent No.: US 10,793,008 B2
(45) Date of Patent: Oct. 6, 2020

(54) SYSTEM AND METHOD FOR INDICATING BATTERY AGE

(71) Applicant: FORD GLOBAL TECHNOLOGIES, LLC, Dearborn, MI (US)

(72) Inventors: Xiaohong Nina Duan, Canton, MI (US); Xu Wang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 881 days.

(21) Appl. No.: 14/887,867

(22) Filed: Oct. 20, 2015

(65) Prior Publication Data
US 2017/0106766 A1      Apr. 20, 2017

(51) Int. Cl.
H01M 10/48      (2006.01)
H01M 10/42      (2006.01)
(Continued)

(52) U.S. Cl.
CPC .......... B60L 11/1857 (2013.01); B60K 35/00 (2013.01); B60L 58/13 (2019.02); B60L 58/16 (2019.02); H01M 10/425 (2013.01); H01M 10/48 (2013.01); H01M 10/488 (2013.01); *B60K 6/20* (2013.01); *B60K 2370/174* (2019.05); *B60L 2210/10* (2013.01); *B60L 2210/30* (2013.01); *B60L 2210/40* (2013.01); *B60L 2240/545* (2013.01); *B60L 2240/547* (2013.01); *B60L 2240/549* (2013.01); *B60Y 2200/91* (2013.01); *B60Y 2200/92* (2013.01); *B60Y 2400/308* (2013.01); *B60Y 2400/92* (2013.01); *H01M 2220/20* (2013.01); *Y02T 10/7005* (2013.01); *Y02T 10/705* (2013.01); *Y02T 10/7044* (2013.01); *Y02T 10/84* (2013.01); *Y10S 903/904* (2013.01)

(58) Field of Classification Search
CPC ......... B60K 6/40; B60W 10/06; B60W 10/08; B60W 10/26; B60W 20/14; B60W 2510/244; B60W 2510/246; B60W 2710/18; B60Y 2200/92; B60Y 2300/188; Y10S 903/93; Y10S 903/951
See application file for complete search history.

(56) References Cited

U.S. PATENT DOCUMENTS 4,638,237 A * 1/1987 Fernandez ......... G01R 31/3606
                                                320/DIG. 21
7,009,401 B2    3/2006 Kinoshita et al.
(Continued)

OTHER PUBLICATIONS

DeCoursey WJ, Statistics & Probability for Engineering Applications with Microsoft Excel (Elsevier 2003).*

*Primary Examiner* — Charles J Han
(74) *Attorney, Agent, or Firm* — David Kelley; Brooks Kushman PC

(57) ABSTRACT

A vehicle includes a traction battery and a controller. The controller is programmed to output an age value of the traction battery based on a ratio of a reference capacity value to an initial reference capacity. The reference capacity value is derived from a mean and a standard deviation of a plurality of historical battery capacity values and has a predetermined probability of being less than an actual battery capacity. The controller is programmed to adjust a battery control strategy based on the age value. The vehicle includes an instrument cluster that is configured to display the age value.

19 Claims, 3 Drawing Sheets

(51) Int. Cl.
    *B60L 58/13*    (2019.01)
    *B60L 58/16*    (2019.01)
    *B60L 11/18*    (2006.01)
    *B60K 35/00*    (2006.01)
    *B60K 6/20*    (2007.10)

(56) References Cited

U.S. PATENT DOCUMENTS

| | | |
|---|---|---|
| 8,629,657 B2 | 1/2014 | Kishiyama et al. |
| 2005/0077867 A1* | 4/2005 | Cawthorne ............ B60K 6/445 |
| | | 320/104 |
| 2005/0151513 A1* | 7/2005 | Cook .................... H02J 7/1423 |
| | | 320/137 |
| 2013/0085696 A1 | 4/2013 | Xu et al. |
| 2014/0217958 A1* | 8/2014 | Verdun .................. H02J 7/007 |
| | | 320/107 |
| 2014/0278169 A1 | 9/2014 | Kim |
| 2015/0046109 A1* | 2/2015 | Miwa ................. G01R 31/3679 |
| | | 702/63 |
| 2015/0057957 A1 | 2/2015 | Kim |
| 2016/0193474 A1* | 7/2016 | Gumbrell ............. A61N 1/3925 |
| | | 607/5 |

* cited by examiner

SYSTEM AND METHOD FOR INDICATING BATTERY AGE

TECHNICAL FIELD

This application generally relates to a system for indicating the age of a traction battery.

BACKGROUND

Hybrid and electric vehicles include a high-voltage traction battery to provide stored electrical energy for propulsion and other vehicle functions. Performance of the traction battery may change over time. For example, the maximum amount of energy that may be stored by the traction battery generally decreases over time. To better control the traction battery, it is useful to estimate the battery capacity. Additionally, it may be useful to estimate an approximate age of the traction battery in order to detect when the battery is nearing end of life.

SUMMARY

In some configurations, a vehicle includes a traction battery. The vehicle also includes a controller programmed to output a traction battery age based on a ratio of a reference amp-hour value having a predetermined probability of being less than an actual amp-hour value to a beginning-of-life amp-hour value, in which the reference amp-hour value is derived from a mean and standard deviation of a plurality of historical amp-hour values of the traction battery. Other configurations may include corresponding computer systems, apparatus, and computer programs recorded on one or more computer storage devices, each configured to perform the actions of the methods.

Some configurations may include one or more of the following features. The vehicle in which the historical amp-hour values are normally distributed. The vehicle in which the predetermined probability is a value between 0.5 and 1.0, inclusive. The vehicle may include an instrument cluster configured to display the traction battery age. The vehicle in which the traction battery age takes on one of a plurality of predetermined discrete states according to the ratio being less than corresponding predetermined thresholds. The vehicle in which the predetermined discrete states include a new state, a mid-life state, and an end-of-life state. The vehicle in which the controller is further programmed to operate the traction battery based on the traction battery age. The vehicle in which the historical amp-hour values includes a most recent predetermined number of estimated amp-hour values. Implementation of the described configurations may include hardware, a method or process, or computer software on a computer-accessible medium.

In some configurations, a vehicle includes an instrument cluster configured to display an age state of a traction battery. The vehicle also includes a controller programmed to output the age state based on a ratio of a reference amp-hour value having a predetermined probability of being less than an actual amp-hour value to a beginning-of-life amp-hour value, in which the reference amp-hour value is derived from a mean and a standard deviation of a plurality of historical amp-hour values. Other configurations may include corresponding computer systems, apparatus, and computer programs recorded on one or more computer storage devices, each configured to perform the actions of the methods.

Some configurations may include one or more of the following features. The vehicle in which the age state includes a new state, a mid-life state, and an end-of-life state. The vehicle in which the instrument cluster is further configured to display the new state in a first color, the mid-life state in a second color, and the end-of-life state in a third color. The vehicle in which the controller is further programmed to operate the traction battery according to the age state. The vehicle in which the plurality of historical amp-hour values includes a most recent predetermined number of estimated amp-hour values of the traction battery. The vehicle in which the plurality of historical amp-hour values are normally distributed. Implementation of the described configurations may include hardware, a method or process, or computer software on a computer-accessible medium.

In some configurations, a method includes outputting, by a controller, an age of a traction battery based on a ratio of a reference amp-hour value having a predetermined probability of being less than an actual amp-hour value to a beginning-of-life amp-hour value, wherein the reference amp-hour value is derived from a mean and a standard deviation of a plurality of historical amp-hour values. The method also includes operating, by the controller, the traction battery according to the age. Other configurations may include corresponding computer systems, apparatus, and computer programs recorded on one or more computer storage devices, each configured to perform the actions of the methods.

Some configurations may include one or more of the following features. The method in which the traction battery age takes on one of a plurality of predetermined discrete states. The method in which the predetermined discrete states are based on the ratio being less than corresponding predetermined thresholds. The method in which the historical amp-hour values includes a most recent predetermined number of estimated amp-hour values. The method may include displaying, by an instrument cluster, the traction battery age. Implementation of the described configurations may include hardware, a method or process, or computer software on a computer-accessible medium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
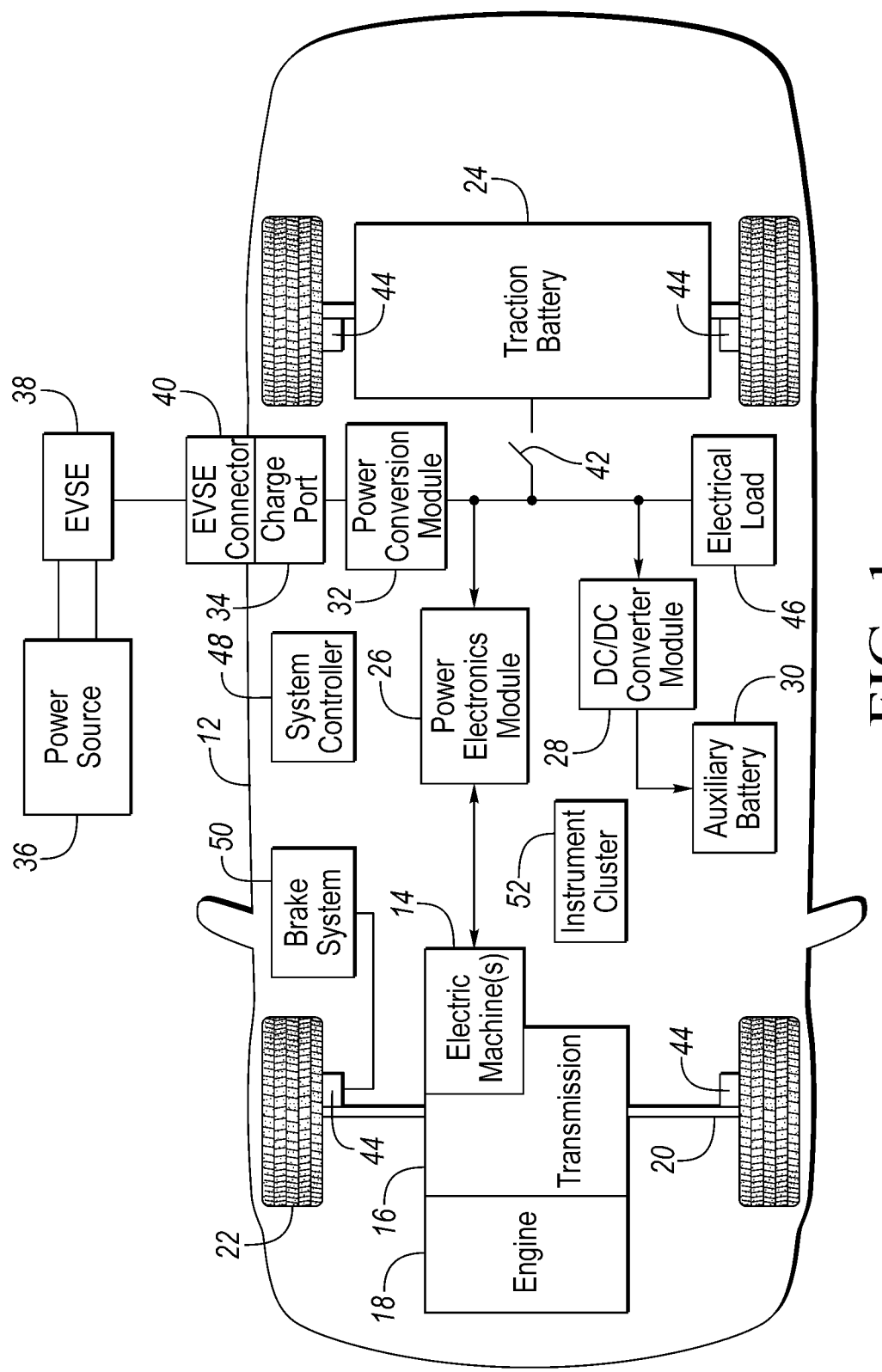
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 may be electrically coupled to one or more power electronics modules. One or more contactors 42 may isolate the traction battery 24 from other components when opened and connect the traction battery 24 to other components when closed. The power electronics module 26 may also be electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery. Other high-voltage loads 46, such as compressors and electric heaters, may be coupled to the high-voltage output of the traction battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system connections may be hydraulic and/or electrical. The brake system 50 may include a controller to monitor and coordinate operation of the wheel brakes 44. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The vehicle 12 may include an instrument cluster 52. The instrument cluster 52 may include a display screen that may be a touch screen. The instrument cluster 52 may include light producing devices such as lamps, lights, and light-emitting diodes (LED). The instrument cluster 52 may include descriptive text or messages that are illuminated by the light producing devices. The instrument cluster 52 may be mounted in a location that is easily viewed by a driver and/or occupants of the vehicle 12. The instrument cluster 52 may include gauges and indicators for various operating parameters of the vehicle 12 (e.g., vehicle speed, engine speed, fuel level). The instrument cluster 52 may be configured to display information in analog or digital form. The instrument cluster 52 may include one or more message displays that are configured to communicate messages to the driver. The instrument cluster 52 may be configured to display information regarding the traction battery 24.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2:
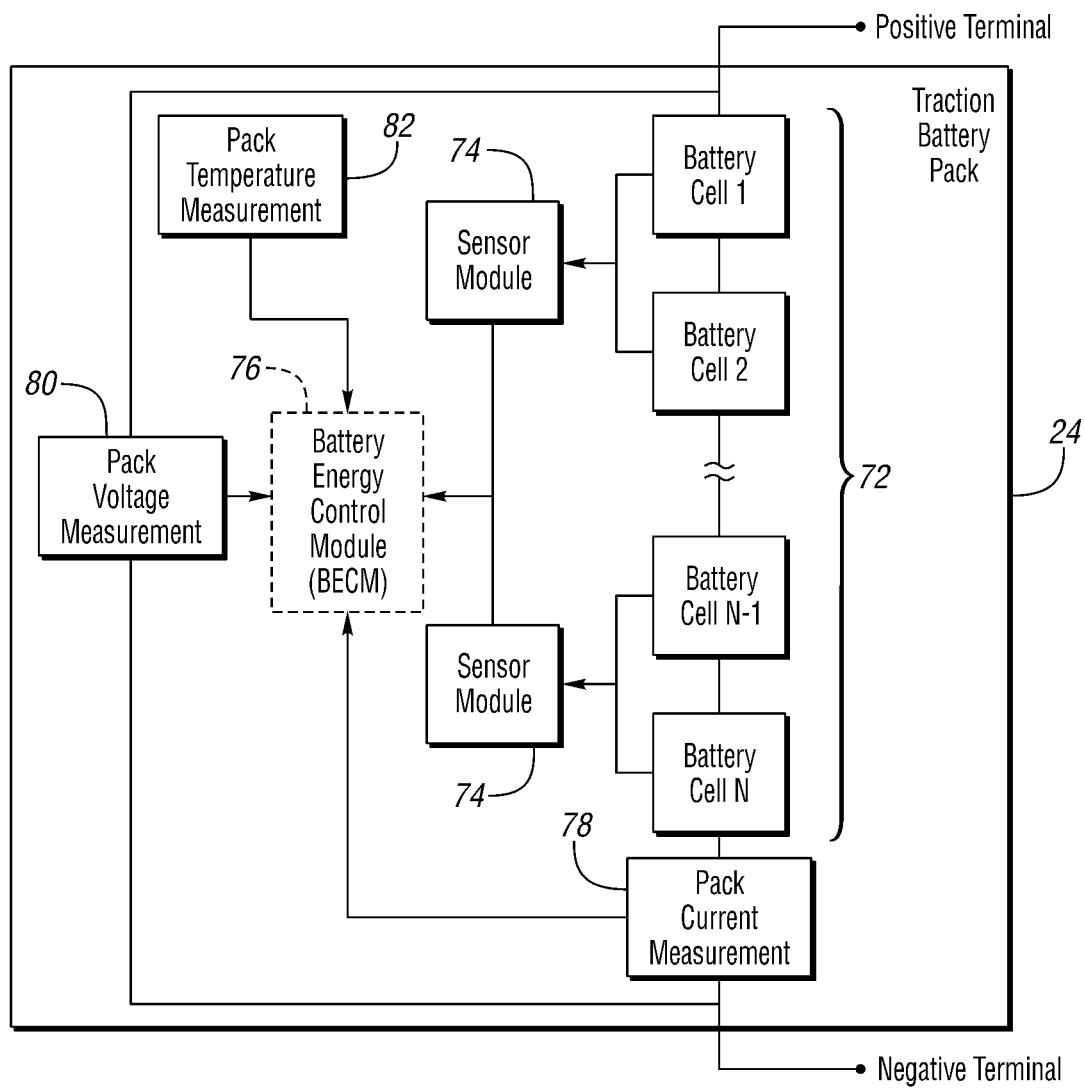
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use one or more sensor modules 74 to measure the battery cell 72 characteristics. Depending on the capabilities, the sensor modules 74 may measure the characteristics of one or multiple of the battery cells 72. The battery pack 24 may utilize up to $N_c$ sensor modules 74 to measure the characteristics of all the battery cells 72. Each of the sensor modules 74 may transfer the measurements to the BECM 76 for further processing and coordination. The sensor modules 74 may transfer signals in analog or digital form to the BECM 76. In some configurations, the functionality of the sensor modules 74 may be incorporated internally to the BECM 76. That is, the hardware of the sensor modules 74 may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such as battery power capability, battery capacity, and battery state of charge may be useful for controlling the operation of the traction battery 24 as well as any electrical loads receiving power from the traction battery 24. Battery power capability is a measure of the maximum amount of power the traction battery 24 can provide or the maximum amount of power that the traction battery 24 can receive. Knowing the battery power capability allows the electrical loads to be managed such that the power requested is within limits that the traction battery 24 can handle.

Battery capacity is a measure of a total amount of energy that may be stored in the traction battery 24. The battery capacity may be expressed in units of Amp-hours. Values related to the battery capacity may be referred to as amp-hour values. The battery capacity of the traction battery 24 may decrease over the life of the traction battery 24.

State of charge (SOC) gives an indication of how much charge remains in the traction battery 24. The SOC may be expressed as a percentage of the total charge remaining in the traction battery 24. The SOC value may be output to inform the driver of how much charge remains in the traction battery 24, similar to a fuel gauge. The SOC may also be used to control the operation of an electric or hybrid-electric vehicle. Calculation of SOC can be accomplished by a variety of methods. One possible method of calculating SOC is to perform an integration of the traction battery current over time. This is well-known in the art as ampere-hour integration.

An energy management system may operate the traction battery 24 to manage the state of charge of the traction battery 24. The traction battery 24 may be charged or discharged according to a target state of charge compared to a present state of charge. For example, when the present state of charge is greater than the target state of charge, the traction battery 24 may be discharged. Operation of the traction battery 24 may be achieved by commanding a torque of the electric machines 14 to draw current from or provide current to the traction battery 24. Operation of the traction battery 24 may further involve commanding operation of the engine 18 to provide power to the electric machines 14 to charge the traction battery 24.

Over the lifetime of the traction battery 24, the capacity of the traction battery 24 may decrease. This may be referred to as aging of the traction battery 24. In order to properly control the vehicle 12, it is useful to know the capacity as the traction battery 24 ages. By estimating the capacity, vehicle control strategies may be adjusted to maintain acceptable vehicle performance. For example, SOC window limits (e.g., minimum, low, high, and maximum) may define the normal SOC operating range. As the battery capacity decays, the SOC window limits may be adjusted to ensure that (i) there is enough energy between the low and high SOC window limits, (ii) there is enough power to start the engine to meet emissions standards, and (iii) battery overcharge protection remains robust to sensor measurement inaccuracy or error.

Various self-learning algorithms are available for estimating battery capacity. However, the identified capacity value may not be a monotonically varying parameter due to variations in environmental conditions and measurement errors. As the estimated battery capacity value may fluctuate, the direct learned capacity value of the self-learning algorithms may be unsuitable for use as an age indicator for the traction battery 24. A better age indication may be one that changes monotonically and does not vary in the presence of varying vehicle conditions and measurement errors. The system and methods disclosed herein provide an improved age estimate of the traction battery in the presence of these variations and measurement errors. The age estimate of the traction battery 24 may be used to adjust battery control strategies to improve performance over the life of the vehicle.

The BECM 76 may be programmed to estimate the traction battery capacity during operation of the vehicle 12. The battery capacity learning strategy may be any algorithm or strategy known in the prior art. For example, battery charge capacity may be estimated as battery current throughput divided by a difference in state of charge (SOC) values. This approach is based on knowledge of two separate SOC values obtained independent of battery capacity. The battery capacity may be calculated as:

$$Q = \frac{\int_{Ti}^{Tf} i\,dt}{SOC_i - SOC_f} = \frac{\text{Throughput}}{SOC_i - SOC_f} \quad (1)$$

where $SOC_i$ and $SOC_f$ are the state of charge values at times $T_i$ and $T_f$ respectively and i is the current flowing to or from the battery. The battery current throughput may be defined as the integral of battery current over a time period. When implemented in a controller 76, the integral may be replaced by a summation of current values multiplied by the sample time.

The state of charge values may be based on measured voltages sampled over two key-on/key-off cycles. For a lithium-ion battery, it is well-known that after the battery has been resting a sufficient time, the terminal voltage is approximately equal to the open-circuit voltage of the battery (i.e., $V_t = V_{oc}$). The terminal voltage may be measured at power-up and the state of charge may be derived from the open-circuit voltage. A relationship between state of charge and open-circuit voltage may be obtained via test data or manufacturer data. The throughput may be calculated over each ignition cycle and stored in a non-volatile memory for use in the next ignition cycle. Other methods of battery capacity may be equally applicable to the methods and systems described herein.

The BECM 76 may be programmed to generate a parameter that represents an age of the traction battery 24. The parameter may be based on the learned battery capacity values. When a new battery capacity value is available, the BECM 76 may perform a statistical algorithm to further analyze the battery capacity values and output a battery age parameter. The statistical method may include computing a mean value and standard deviation of the estimated battery capacity values from present and previous vehicle operation. The statistical algorithm may include a confidence analysis to ascertain if the battery capacity is within a predetermined confidence range.

A sliding window may be selected. The sliding window may include a fixed number, n, of estimated battery capacity values. The estimated capacity values may be the most recent number, n, of historical amp-hour values determined by the BECM 76 and may be stored in non-volatile memory of the BECM 76. The running mean value may be the mean value of the n historical values of the sliding window. The running standard deviation may be the standard deviation of the n historical values of the sliding window. The running mean value may be expected to decrease as the battery ages and the battery capacity degrades. The running mean and running standard deviation may be used to determine a probability (expressed as a percentage) of the actual battery capacity (actual amp-hour value) being within a selected range.

A normal distribution function may be used to describe a variety of random variables. The normal distribution may be characterized by a mean value, $\mu$, and a standard deviation, $\sigma$. The normal distribution may be normalized to obtain a standard score, also referred to as a Z-value. The Z-value for a given random variable, x, is given by:

$$Z = \frac{x - \mu}{\sigma} \quad (2)$$

where x is the random variable, $\mu$ is the mean value of the random variable, and $\sigma$ is the standard deviation of the random variable.

The normal distribution may be used to characterize the distribution of battery capacity values in the traction battery 24. In this case, the random variable may be the battery capacity as represented by the historical values. The Z-value for the random variable representing the battery capacity may be given by:

$$z = \frac{C - \mu}{\sigma} \quad (3)$$

where C is the battery capacity, $\mu$ is the mean of the battery capacity, and $\sigma$ is the standard deviation of the battery capacity. The Z-value represents the distance of the capacity from the mean value. Using the distribution, the probability of the actual battery capacity being greater than a reference battery capacity can be calculated. A reference capacity value, $\chi$, may be defined such that there is a predetermined probability that the actual battery capacity is greater than the reference capacity value, expressed as $P(C \geq \chi)$. The reference capacity value may be in units of amp-hours and may be referred to as a reference amp-hour value.

The random variable may first be converted into Z-values. Converting the reference capacity limit into a Z-value yields:

$$Z = \frac{\chi - \mu}{\sigma} \quad (4)$$

The probability of the actual battery capacity being greater than the reference capacity value may be expressed as Z-values. That is, the probability may be represented as $P(z \geq Z)$. The probability may be resolved by standard Z-value lookup tables.

Figure 3:
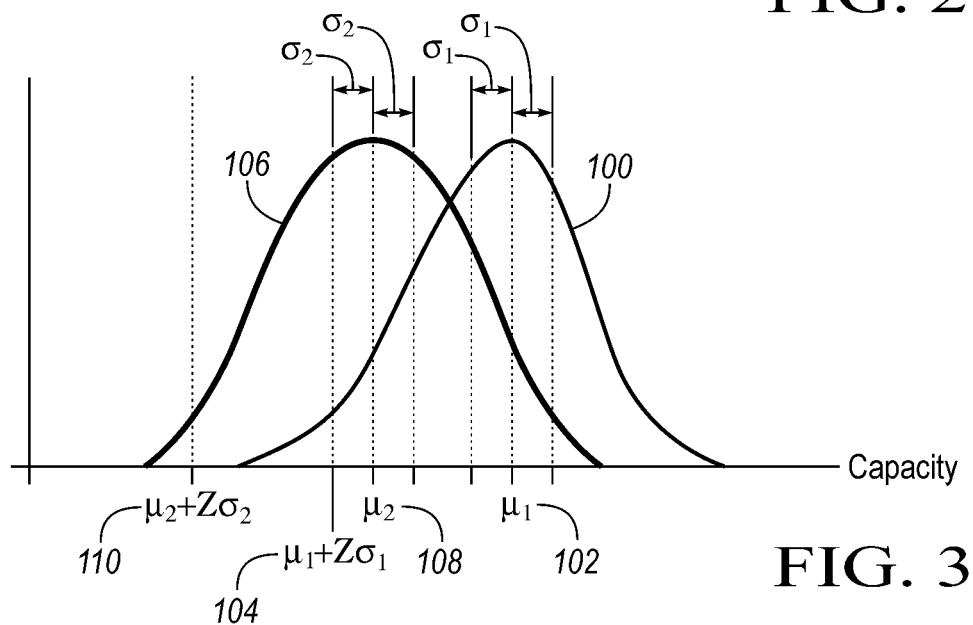
FIG. 3 is a plot of possible probability density functions for battery capacity at two different points in time.

The battery capacity value may be modeled using a normal distribution as depicted in FIG. 3. The initial capacity of the traction battery 24 may be modeled as a first probability density function 100 having a first mean value 102. A first reference capacity value 104 may be described as the reference capacity value that the actual battery capacity exceeds with a predetermined probability at a time when the first probability density function 100 describes the condition of the traction battery 24. As the battery ages, the battery capacity degrades and may be described by a second probability density function 106 having a second mean value 108 that is less than the first mean value 102. The second probability density function 106 may represent the condition of the traction battery 24 at a second time point after the first condition described by the first probability density function 100. The second reference capacity value 110 may be described as the reference capacity value that the actual battery capacity exceeds with a predetermined probability at the second time point. The computation and usage of the reference capacity values is described herein.

It may be desired to compute the reference capacity value for which the probability of the actual battery capacity exceeding the reference capacity value is a predetermined value. It may be useful to determine when $P(z \geq Z)$ is a predetermined probability. For example, the predetermined probability may be set to a 0.9 confidence level. This would mean that there is a 90% chance that the actual battery capacity exceeds the reference capacity value. The predetermined probability may be calibrated to a selectable value during a calibration procedure or system set up. The predetermined probability may be configured to be in a predetermined range, such as between 0.5 and 1.0 inclusive. Further, knowing the confidence level may determine the value of Z. The value of Z may be derived from standard Z-value lookup tables. From the standard tables, a value of a confidence level for $P(z \geq Z)$ of 0.9 results in a Z-value of minus 1.282 (−1.282). Other confidence levels may be similarly derived.

Knowing the Z-value for the desired confidence level allows the reference capacity value to be computed from equation (4) as:

$$\chi = \mu_k + Z\sigma_k \quad (5)$$

This value defines the reference capacity level for which the actual battery capacity is expected to be greater than with a probability defined by the selected confidence level. Referring to FIG. 3, the first reference capacity value may be determined as $\chi_1 = \mu_1 + Z\sigma_1$. The second reference capacity value may be determined as $\lambda_2 = \mu_2 + Z\sigma_2$. To achieve a 0.9 confidence level, the Z-value of minus 1.282 (−1.282) may be used. The mean and standard deviation values may be computed as described herein.

The statistical methods that are used provide a useful indication of the battery age. Knowing that the actual battery capacity is above the reference capacity value with the specified probability provides useful data for operating vehicle. Using statistical methods provides some certainty that the actual battery capacity is within an acceptable range.

The Z-value represents the distance of the reference capacity limit from the mean value. From the Z-value, the probability of the distribution being greater than the given value may be determined. During normal battery operation, the reference capacity value will generally be less than the running mean. The z-value may generally be a negative value in this application.

The probability of the actual battery capacity being greater than the reference capacity value may be determined as the area under the curve (e.g., 100, 106) from the reference capacity value (e.g., 104, 110) to the right tail. The right tail may be that portion of the curve that approaches zero as the capacity increases toward infinity. The confidence level of the actual battery capacity exceeding the reference capacity value may be given as a number $P(z \geq Z)$.

The mean and the standard deviation may be computed using a first-in first-out buffer. As battery capacity is estimated by the controller 76, the amp-hour values may be stored in a buffer. The buffer may represent the historical amp-hour values. As a new battery capacity estimate is determined, the oldest estimate in the buffer may be removed from the buffer. The mean and the standard deviation may then be computed using the updated capacity values in the buffer. This method of computation may require that the last n capacity values be stored in non-volatile memory of the BECM 76 to retain the values between ignition cycles. The mean value and the standard deviation may be computed as:

$$\mu = \frac{1}{n}\sum_{i=1}^{n} C_i \quad (6)$$

$$\sigma = \sqrt{\frac{1}{n}\sum_{i=1}^{n}(C_i - \mu)^2} \quad (7)$$

where $C_i$ is the $i^{th}$ capacity value and n is the number of capacity values in the buffer.

The mean and standard deviation may also be computed using the previously computed values of the mean and standard deviation. The mean may be calculated as:

$$\mu_k = \frac{n-1}{n}\mu_{k-1} + \frac{1}{n}C_{est} \quad (8)$$

where $C_{est}$ is the estimated capacity from the present cycle, $\mu_{k-1}$ is mean capacity from a previous execution cycle, and n is a sample size. The standard deviation may be calculated as:

$$\sigma_k = \sqrt{\frac{n-1}{n}\sigma_{k-1}^2 + \frac{1}{n}(C_{est} - \mu_k)^2} \quad (9)$$

where $\mu_k$ and $\sigma_k$ are the mean capacity and the standard deviation updated in the present cycle and $\sigma_{k-1}$ is the standard deviation updated in the previous execution cycle.

The mean and the standard deviation may be used to compute the reference capacity value according to equation (5). This yields the reference capacity value that the actual battery capacity is expected to be greater than with the predetermined probability.

As the battery ages, the battery capacity may be expected to decrease. Over time, the mean value of the battery capacity estimates may be expected to decrease. As a result, the reference capacity value may also decrease as depicted. A capacity retention function may be expressed as:

$$\text{Capacity Retention} = \frac{\chi}{\chi_0}100 \quad (10)$$

where $\chi_o$ is an beginning-of-life capacity value (beginning-of-life amp-hour value) for an unaged cell. For example, a value equivalent to the first reference capacity value 104 may be used as the beginning-of-life capacity value. The capacity retention value may represent a percentage of capacity that is retained from the initial condition of the traction battery 24. A corresponding decay function may be expressed as:

$$\text{Capacity Decay} = 100 - \text{Capacity Retention} \quad (11)$$

The capacity decay value may represent a percentage of capacity that is lost from the initial condition of the traction battery 24.

For a new traction battery 24, the capacity retention value may start at one hundred as the numerator and denominator should be approximately equal. As the traction battery 24 ages, the numerator may decrease so that the capacity retention percentage decreases. Alternatively, the capacity decay value may increase as the traction battery ages. The capacity decay value or the capacity retention value may be used as an indication of the battery age.

The BECM 76 may be programmed to output a value indicative of the age of the traction battery 24 to other modules, including the instrument cluster 52. The BECM 76 may be programmed to generate and output the age as one of a plurality of predetermined discrete values for each battery stage of life.

The instrument cluster 52 may be configured to display the age value, in digital or analog form, as a percentage value. In some configurations, the instrument cluster 52 may be configured to display the age value as a bar graph. The instrument cluster 52 may be configured to display the capacity decay value or the capacity retention value. In some configurations, the age of the traction battery 24 may be classified into one of a plurality of predetermined discrete states. When the capacity retention value is greater than a first predetermined threshold, the traction battery 24 may be classified as being in a new state. When the capacity retention value is less than a second predetermined threshold that is less than the first predetermined threshold, the traction battery 24 may be classified as being in an old or end-of-life state. When the capacity retention value is between the first and second threshold values, the traction battery 24 may be classified as being in a mid-life state. In some configurations, the instrument cluster 52 may be configured to display an output indicative of the state of life of the traction battery 24. The instrument cluster 52 may display a message that indicates the age of the battery as new, mid-life, or end-of-life depending on the age value. The instrument cluster 52 may display a different color message or symbol for each state of life. Green may represent the new state, yellow may represent the mid-life state, and red may represent the end-of-life state. The battery life indication may aid the vehicle owner in understanding upcoming vehicle maintenance needs.

Figure 4:
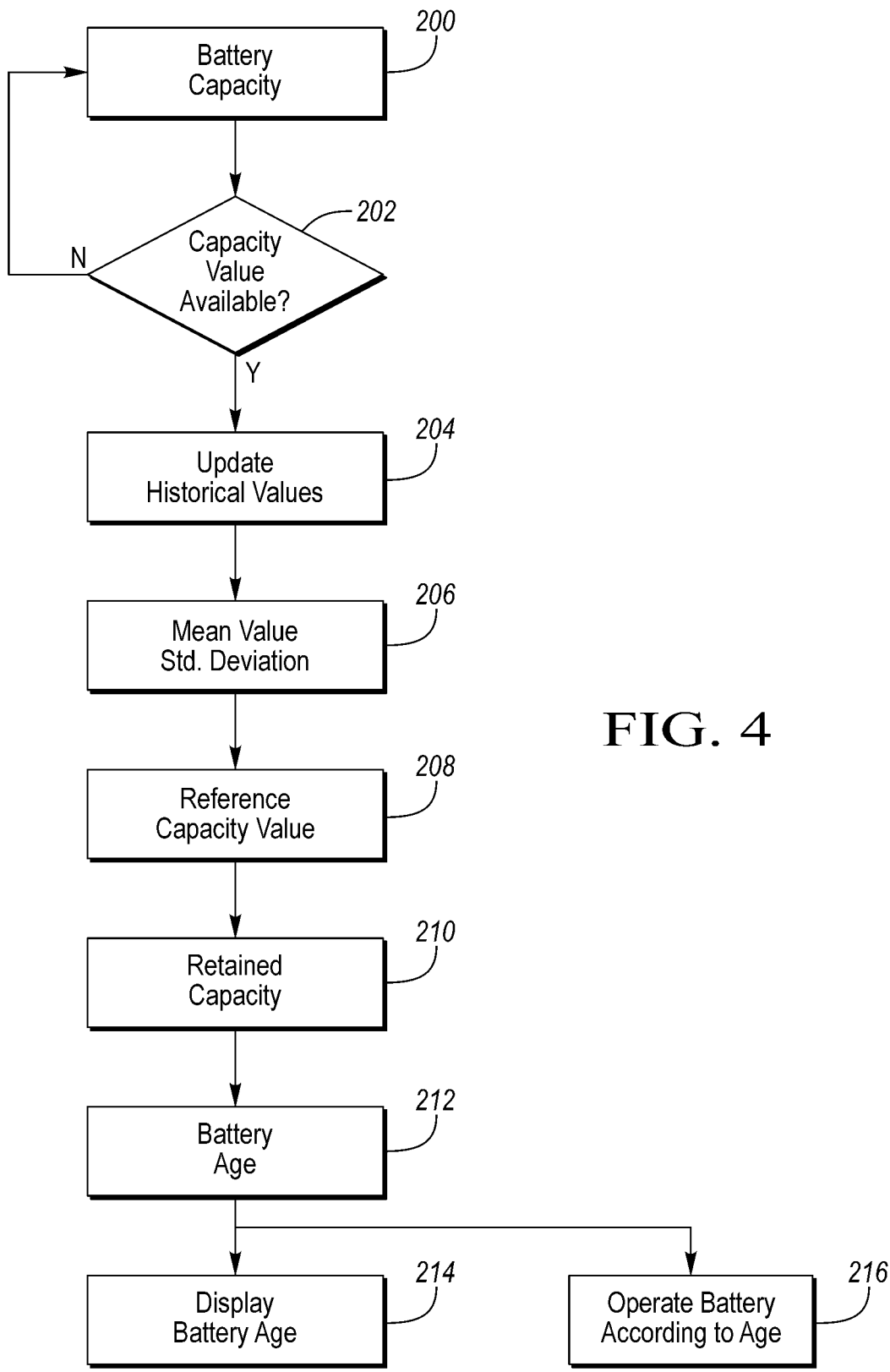
FIG. 4 is a flowchart of a possible sequence of operations for estimating an age of a traction battery.

FIG. 4 depicts a flow chart describing a possible sequence of operations for the battery age indicator. At operation 200 battery amp-hour value may be estimated by any available methods. At operation 202, a check may be made to determine if a new battery amp-hour value is available. If a new battery amp-hour value is not available, execution may return to operation 200. If a new battery amp-hour value is available, operation 204 may be executed to update the historical amp-hour values. For example, a first-in first-out buffer may be updated using the recently computed battery amp-hour value.

At operation 206, the statistical values may be computed. The mean value and standard deviation may be computed based on the historical amp-hour values. At operation 208, a reference amp-hour value may be computed corresponding to the reference capacity value. The reference amp-hour value may be that capacity value that has a predetermined probability of being less than the actual amp-hour value. At operation 210, the retained capacity and/or the related capacity decay value may be computed. A ratio of the reference amp-hour value to the beginning-of-life amp-hour value may be computed. At operation 212, a value indicative of the battery age may be computed and output for other modules. For example, a discrete-valued stage of life may be determined according to predetermined thresholds. At operation 214, the battery age indicator may be displayed by the instrument cluster 52. At operation 216, the traction battery 24 may be operated according to the age.

The battery age computation may provide a good estimate of the age of the traction battery. The use of statistical values in the computation allows more samples to be used to improve the estimate of battery age. Prior methods based on the current battery capacity are prone to fluctuations and are not monotonically non-increasing as the actual battery capacity is likely to be.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery; and
   a controller programmed to output a traction battery age that is estimated based on a ratio of a reference battery capacity value, derived from a mean and standard deviation of a plurality of historical battery capacity estimates of the traction battery and having a predetermined probability of being less than an actual battery capacity value, to a beginning-of-life battery capacity value.

2. The vehicle of claim 1 wherein the historical battery capacity estimates are normally distributed.

3. The vehicle of claim 1 wherein the predetermined probability is a value between 0.5 and 1.0, inclusive.

4. The vehicle of claim 1 further comprising an instrument cluster configured to display the traction battery age.

5. The vehicle of claim 4 wherein the traction battery age assumes one of a plurality of predetermined discrete states according to the ratio being less than corresponding predetermined thresholds.

6. The vehicle of claim 5 wherein the predetermined discrete states include a new state, a mid-life state, and an end-of-life state.

7. The vehicle of claim 1 wherein the controller is further programmed to operate the traction battery based on the traction battery age.

8. The vehicle of claim 1 wherein the historical battery capacity estimates include a most recent predetermined number of battery capacity estimates.

9. A vehicle comprising:
 an instrument cluster configured to display an age state of a traction battery; and
 a controller programmed to output the age state estimated based on a ratio of a reference amp-hour value to a beginning-of-life amp-hour value, wherein the reference amp-hour value is derived from a mean and a standard deviation of a plurality of historical amp-hour estimates and has a predetermined probability of being less than an actual amp-hour value.

10. The vehicle of claim 9 wherein the age state includes a new state, a mid-life state, and an end-of-life state.

11. The vehicle of claim 10 wherein the instrument cluster is further configured to display the new state in a first color, the mid-life state in a second color, and the end-of-life state in a third color.

12. The vehicle of claim 9 wherein the controller is further programmed to operate the traction battery according to the age state.

13. The vehicle of claim 9 wherein the plurality of historical amp-hour estimates includes a most recent predetermined number of amp-hour estimates of the traction battery.

14. The vehicle of claim 9 wherein the plurality of historical amp-hour estimates are normally distributed.

15. A method comprising:
 outputting, by a controller, an age of a traction battery estimated based on a ratio of a reference amp-hour value to a beginning-of-life amp-hour value, wherein the reference amp-hour value is derived from a mean and a standard deviation of a plurality of historical amp-hour estimates and has a predetermined probability of being less than an actual amp-hour value; and
 operating, by the controller, the traction battery according to the age.

16. The method of claim 15 wherein the age assumes one of a plurality of predetermined discrete states.

17. The method of claim 16 wherein the predetermined discrete states are based on the ratio being less than corresponding predetermined thresholds.

18. The method of claim 15 wherein the historical amp-hour estimates include a most recent predetermined number of amp-hour estimates.

19. The method of claim 15 further comprising displaying, by an instrument cluster, the age of the traction battery.

\* \* \* \* \*